United States Patent [19]

Hallam

[11] 4,026,568

[45] May 31, 1977

[54] TRIPLE HINGED FOLDING T FRAME WHEELCHAIR

[76] Inventor: Beverly Grant Rutledge Hallam, 212 Queen St., Suite 302, Fredericton, New Brunswick, Canada, E3B 1A8

[22] Filed: Feb. 23, 1976

[21] Appl. No.: 660,701

[52] U.S. Cl. .................................. 280/42; 280/647; 280/650

[51] Int. Cl.[2] .......................................... B62B 11/00

[58] Field of Search .................... 280/650, 647, 42; 297/DIG. 4

[56] References Cited

UNITED STATES PATENTS

| | | | |
|---|---|---|---|
| 2,431,112 | 11/1947 | Everest | 280/42 X |
| 2,847,058 | 8/1958 | Lee | 280/42 X |
| 3,142,351 | 7/1964 | Green | 280/42 |
| 3,331,614 | 7/1967 | McClintock | 280/42 |

*Primary Examiner*—Robert R. Song
*Attorney, Agent, or Firm*—Michael M. Sakovich

[57] ABSTRACT

A foldable wheelchair includes a pair of sides each having an upstanding backrest support member, and a soft backrest suspended between both members. Below each member there is mounted a side wheel for propelling the chair. A pair of seat supports interconnect the sides. Each seat support includes two upstanding rectangular panels having inner ends that are hingedly interconnected and outer ends that are hingedly connected to respective sides. A seat is mounted between the sides and is supported by the seat supports when the wheelchair is infolded. The seat includes two rectangular panels having inner ends that are hingedly interconnected and outer ends that are hingedly connected to respective sides. A longitudinal bar interconnects the hinged inner ends of the seat supports and a tee portion at one end of the bar carries a wheeled footrest. When the bar is drawn forwardly, the chair is unfolded to provide an extended wheelbase and the respective parts of the chair are locked in place by the weight of a person on the seat. The wheelbase is shortened and the chair folded for storage by pushing the bar rearwardly between the sides which folds the seat supports rearwardly and the seat upwardly.

12 Claims, 8 Drawing Figures

FIG.5
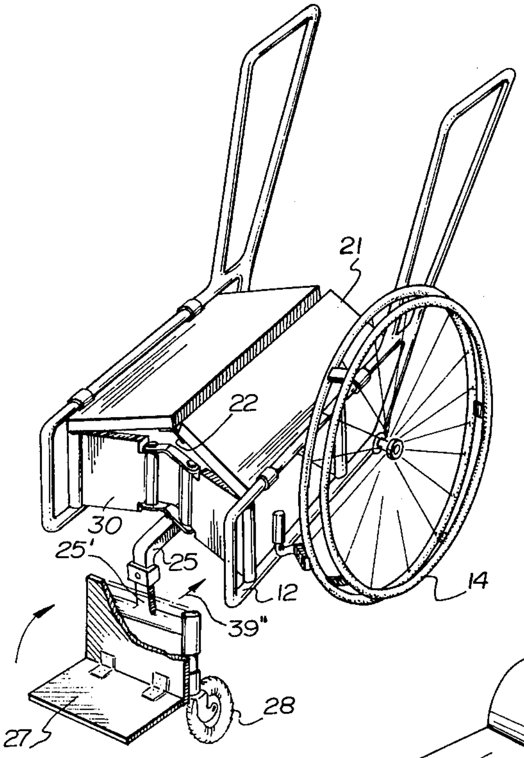
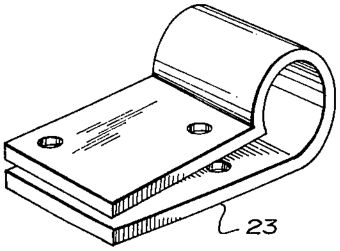
FIG.7
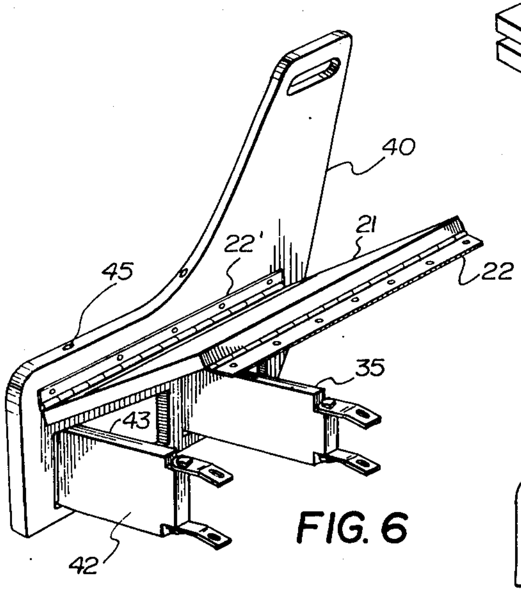
FIG. 6
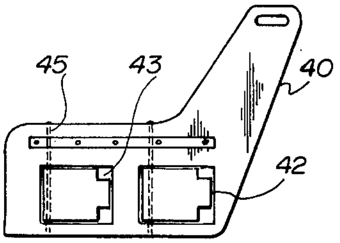
FIG.8

TRIPLE HINGED FOLDING T FRAME WHEELCHAIR

BACKGROUND OF THE INVENTION

This invention relates to a foldable wheelchair and more particularly to a wheelchair having a rigidly supported seat and an extended wheelbase when unfolded.

Wheelchairs that are adapted to fold transversely are well known in the art and commonly employ an X-frame structure which is disposed intermediate a pair of sides, spacing the sides apart and providing a base upon which a collapsible seat may be mounted. The X-frame type of wheelchair folds in a transverse direction only and is therefore committed to a structure having a fixed wheelbase dimension. The wheelbase of the chair is generally kept as small as possible in order to provide a wheelchair of compact dimensions. However, as a result of the shorter wheelbase, the wheelchair tends to tip easily onto its front footrests. A further drawback resulting from the shorter wheelbase occurs in that the chair is caused to tilt back to an unstable position when attempts are made to climb small curbs and steps. Additionally, since pairs of front and rear wheels are generally used, on rough terrain one of the rear wheels can lift up and lose contact with the ground, thus making it impossible for a person seated in the chair to propel it or to apply effective braking action.

Another form of foldable wheelchair structure that is known in the art avoids some of the problems encountered with the X-frame wheelchair structure. This wheelchair structure is typified in U.S. Pat. No. 909,411, Hockney, issued on Jan. 12, 1909. The Hockney patent describes a wheelchair with a pair of side-frames that are interconnected by means of a split seat having a hinged centre joint and outer ends which are hingedly connected to the side frames. A hinged split axle together with a hinged split brace transversely interconnect the side frames and a central rigid reach interconnects the intermediate joints of the axle and brace. A free end of the reach carries a single pivotally mounted wheel at the rear of the wheelchair. The chair is folded transversely and the wheelbase distance between the rear wheel and the propelling wheels, which are forwardly set on the wheelchair frame, is reduced by pushing the reach into the frame structure, causing the axle and brace to fold rearwardly and the split seat to fold downwardly. Latching members are provided to prevent accidental collapse of the wheelchair during periods of use.

It may be seen that the Hockney wheelchair provides a structure having an extended wheelbase. However, the problems of stability when climbing curbs and other raised obstructions are not overcome by Hockney in view of the forward placement of the propelling wheels and the rearward location of the single castor wheel. Thus, it may be expected that instability occurs when the front wheels are raised as when traversing an obstacle and the weight is shifted back over the single castor wheel.

A further problem that may be expected with the Hockney wheelchair may be seen in the central hinge structure of the split seat. Thus, the integrity of the seat as a weight supporting member depends entirely on the strength of the hinge and the strength of the means used to connect the hinge to the seat.

STATEMENT OF THE OBJECTS OF THE INVENTION

An object of the present invention is to provide a foldable wheelchair having an extended wheelbase to increase stability.

Another object of the invention is the provision of a foldable wheelchair that may be opened or folded without opening or closing a locking latch.

A further object of the invention is to provide a wheelchair having rearwardly set propelling wheels, and a small wheeled footrest at the front of the chair to effectively provide only three points of contact between the wheels and a supporting surface, thus ensuring that the rear wheels will always have traction.

SUMMARY OF THE INVENTION

The aforenoted disadvantages of the prior art may be substantially overcome and the objectives achieved by recourse to the present invention which is a foldable wheelchair frame that includes a pair of sides arranged in spaced parallel relation, each having a rearwardly disposed outer portion adapted to carry a wheel spindle. The frame also includes seat support means disposed transversely between the sides, the support means having an upper surface adapted to support a seat, first free ends flexibly connected to opposed first portions of the sides and a first flexible joint intermediate the free ends which permits the support means to fold rearwardly when the sides are drawn together. A seat is disposed transversely between the sides above the support means. The seat has second free ends flexibly connected to opposed second portions of the sides and a second flexible joint intermediate the free ends which permits the seat to fold upwardly when the sides are drawn together. A bar is securably carried by the first flexible joint and is adapted to be longitudinally displaceable forwardly out of and rearwardly into the frame so that rearward displacement of the bar draws the sides together and folds the support means and seat.

DESCRIPTION OF THE DRAWINGS

The invention will now be further described with reference to embodiments thereof shown, by way of example, in the accompanying drawings wherein:

FIG. 5 is a perspective view showing the wheelchair of FIG. 1 in a partly folded configuration;

FIG. 6 is a perspective view of another embodiment for a side frame in the wheelchair of FIG. 1;

FIG. 7 is a perspective view of a clip used to flexibly connect the seat to the frame of the wheelchair shown in FIG. 1; and FIG. 8 is a side view of a portion of the embodiment of FIG. 6.

DESCRIPTION OF THE ILLUSTRATED EMBODIMENTS

Figure 1:
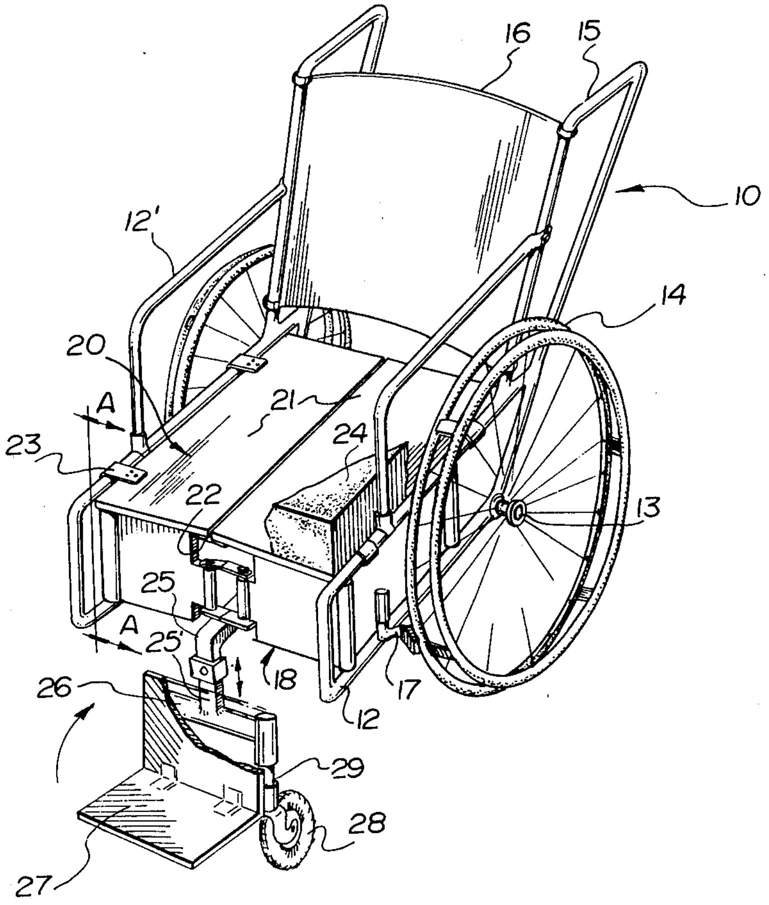
FIG. 1 is a perspective view of a foldable wheelchair according to the present invention.

A perspective view of one embodiment of the invention is shown in FIG. 1 which includes a frame 10 having a pair of sides 12 that are spaced apart in substantially parallel relation. It is seen that each side has a rearwardly disposed outer portion adapted to carry a wheel spindle 13 on which is rotatably mounted a rear wheel 14. Above the spindle 13 it will be noted that each side 12 includes an upstanding backrest support member 15 that is rearwardly inclined a slight amount. A flexible backrest 16 is shown suspended between the members 15. The backrest 16 may be fabricated on any suitable material such as leather, heavy fabric or the like.

A handbrake 17 is shown pivotally mounted on a lower front portion of the side 12 and is located forwardly of the wheel 14 at a position where it can operably engage the wheel. A second handbrake 17 (not shown) is located on the opposite side.

The sides 12, including a pair of arm struts 12', may be fabricated from bar, rod or sheet stock depending upon appearance requirements and other design criteria such as weight and strength as well as availability of materials. Although the frame 10 is shown fabricated from solid rod stock, another embodiment will be later described in which sheet stock material is used.

Figure 2:
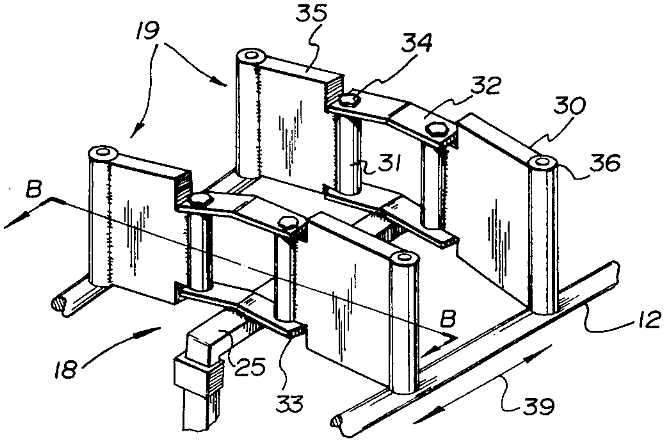
FIG. 2 is a perspective view of seat support means used in the embodiment of FIG. 1.
Figure 3:
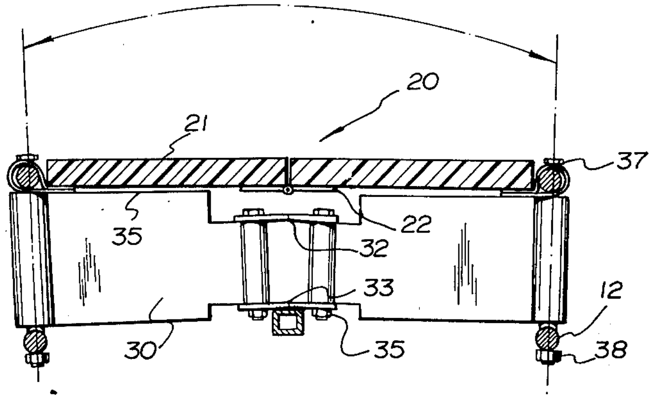
FIG. 3 is a partial end view, which is partially in cross-section, of the wheelchair of FIG. 1 taken along the lines A—A.
Figure 4:
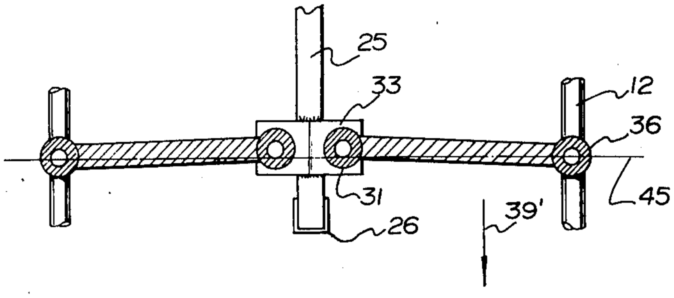
FIG. 4 is a sectional view taken along the lines B—B of FIG. 2.

A seat support 18 is shown disposed transversely between the sides 12 in FIG. 1. The seat support 18 is shown in enlarged detail in FIG. 2 and FIGS. 3 and 4 show particular aspects of its structure which are not readily apparent from the other figures.

Above the seat support 18, a seat 20 is disposed transversely between the sides 12. It will be seen that the seat 20 is formed of two rectangular panels 21 having inner ends which are flexibly interconnected by a butt hinge 22. The free outer ends of the panels 21 are flexibly secured to predetermined portions of the sides 12 by way of clips 23. A perspective view of a clip 23 is shown in FIG. 7.

A cushion 24 is provided to fully cover the seat 20. In order to prevent obscuring details of the wheelchair structure, only a corner portion of the cushion 24 is shown.

A bar 25 is shown in FIG. 1 connected to the seat support 18 and a tee portion 26 of the bar 25 which extends forwardly of the wheelchair and below the seat support 18 is secured to a narrow, wheeled footrest 27. The tee portion 26 is connected to the bar 25 via a vertical bar 25' that is adjustable in height to accommodate the length of an individuals' legs. A pair of castor wheels 28 are connected to opposite ends of the tee portion 26. It will be observed that each castor wheel 28 includes a stem portion 29 that is disposed in a direction perpendicular to the surface supporting the wheelchair. Such positioning of the stems makes it easier to pivot the wheelchair, especially on loose material such as sand, gravel, and carpeting.

Referring now to FIGS. 2 and 3, the seat support 18 is shown in greater detail. For example, it will be seen that the bar 25 includes a longitudinal portion that is fixedly carried by the seat support 18 and is displaceable in the directions of the arrow 39. The seat support 18 is shown to comprise a pair of longitudinal members 19 that are arranged in spaced, substantially parallel relation transverse to the bar 25. Each member 19 includes two half portions, each in the form of an upstanding rectangular panel 30 having inner ends 31 which are adapted to form a double hinged joint with an upper strap 32, a lower strap 33 and a pair of nuts and bolts 34 and 35 respectively. The bar 25 is welded to the straps 33. Each inner end 31 is suitably recessed at the corners to permit free movement about the ends of the straps 32 and 33. In addition, the upper recessed portions of the inner ends 31 allows the upper strap 33, together with the bolts 34, to be mounted below an upper surface 35 of each panel 30, which upper surface engages a corresponding lower surface of each panel 21 when the seat 20 is opened flat in its distended position.

A free outer end 36 of each panel 30 is adapted to form a hinge joint in combination with portions of the sides 12 as shown in FIG. 1. This feature is more clearly illustrated in FIG. 3. Bolts 37 pass through suitably bored portions of the sides 12 and the ends 36, and are held in place with nuts 38.

The panels 30 of FIGS. 2 and 3 are shown to have cylindrically formed ends 31 and 36. In the embodiment illustrated, such ends are welded to each panel 30 and are then bored through to provide a passageway for the bolts 34 and 37. The purpose of the cylindrical form is to provide sufficient material following the boring operation so as to not unduly weaken the ends. However, in the event that smaller diameter high tensile strength bolts are used, the cylindrical configuration of the ends could be dispensed with and the ends retained in a plain square-edge configuration. This structural modification is illustrated in FIG. 6 which shows a portion of one side of a second embodiment of the invention.

The components illustrated in FIG. 6 include a solid side 40 that is fabricated from sheet stock material such as plywood, metal or plastic. Only one seat panel 21 is shown in order to more clearly present the structural members of that side. The seat panel 21 is raised upwardly and is shown to be secured to an inner surface of the side 40 by means of a butt hinge 22'. A similar hinge 22 is shown fixedly secured adjacent the inner end of the panel 21. A pair of upstanding seat support panels 42 are disposed in openings 43 and are secured vertically in the sides 40 by way of long bolts (not shown) that fit in holes 45 as shown in FIG. 8. For the same reasons as described in connection with the panel 30, the upper and lower inner corner of each panel 42 is recessed to provide clearance for the head and nut of the bolt 34 and to prevent interference with the upper surface 35 when it supports the seat 20.

FIG. 3 is a front elevation taken along the lines A—A of FIG. 1 and shows that the sides 12 diverge outwardly from the bottom to the top of the frame 10. There are two reasons for such divergence in the structure, one of which is to compensate for the flexibility of the materials used which is exhibited when a person is seated in the wheelchair. It has been observed that under loaded conditions the seat support 18 tends to sag slightly. This effect is compensated by diverging the sides 12 outwardly as shown in FIG. 3. When the seat 20 is loaded, pressure is applied to the upper surfaces 35 of the panels 30 causing the panels to deflect downwardly and to draw in the sides 12 to a substantially perpendicular position.

The straps 32 and 33 are formed with a slight bend as shown which corresponds to the angle at which the upper surfaces 35 are set relative to the supporting surface of the wheelchair. The purpose of this configuration is to prevent binding between the contacting portions of the ends 31 and the straps 32 and 33 when the chair is unloaded as occurs when the chair is either folded or opened to its distended configuration. While some binding will occur when a person is seated in the chair, this is of no consequence and is in fact helpful since it would serve to lock up the seat support 18 to prevent undesirable movement.

The second reason for introducing outward divergence of the sides 12 is to obtain a wheelchair structure that is easily folded. Such divergence, therefore, assists in avoiding a dead spot in the frame structure which would impede folding the chair. This would otherwise occur if the panels 21 were arranged to be absolutely flat when the wheelchair is fully distended. In the flat seat configuration, moving the bar 25 rearwardly of the frame 10 would not initiate the folding procedure since the panels 21 are not biased in a direction to allow easy upward movement of the butt hinge 22 with subsequent downward folding of the panels 21. The panels 21 must first be lifted. This disadvantage is avoided by slightly raising the inner ends of the panels 21 relative to the outer ends which are secured to portions of the side 12 by means of the clips 23. This arrangement effectively biases the hinged portion of the seat 20 which is intermediate the hinged outer ends of the seat and allows the frame 10 to fold readily when the bar 25 is longitudinally displaced rearwardly into the frame 10. There is of course no difficulty experienced when the seat 20 is loaded since the entire structure is locked up and held in place by the weight of an individual on the seat.

FIG. 4 is a plan view, partly in cross-section, of the front portion of the seat support 18 which is adjacent the tee portion 26 of the bar 25. The portion of the seat support 18 that is illustrated is shown in its fully distended position, that is with the sides 12 fully separated to their maximum distance and the bar 25 drawn forward fully in the direction indicated by the arrow 39'. It will be observed that the panels 30 are not aligned coaxially but rather are offset with respect to the coaxial axis which is represented by a broken line 45. Thus, whereas the hinged joints of the free ends 36 are located on the axis line 45, the hinged joints of the inner ends 31 are located behind the line 45 in the direction of the rear of the frame 10. The purpose of this arrangement is two-fold. Firstly, it assures that the bar 25 can only be pushed rearwardly into the frame 10 between the sides 12 and not pulled outwardly out of the frame 10 as would occur if the panels 30 were arranged in longitudinal alignment. Accordingly, as the bar 25 is drawn forwardly in the direction of the arrow 39', the sides 12 move outwardly from the centre of the wheel chair until a lock-up condition is reached. Since this occurs before the ends 31 reach the axis 45, it is apparent that further forward movement of the bar 25 is not possible but that rearward movement of the bar may occur to fold the chair. The configuration of the rear portion of the seat support 18 is the same as that of the front portion shown in FIG. 4 and has been omitted merely to avoid a duplication of description.

The other reason for arranging the panels 30 of the seat support 18 as shown in FIG. 4 is to provide the aforenoted lock-up feature without including separate latches or rule-type hinges in the hinged joints to limit rotation. In this way, a more simple construction is obtained and manual dexterity on the part of the wheelchair user is not required to operate latches.

FIG. 5 shows the wheelchair embodiment of FIG. 1 when it is in a partially folded condition. Some portions of the embodiment of FIG. 1 have been removed to simplify the illustration. The bar 25 has been displaced rearwardly in the direction of the arrow 39' causing the panels 30 to pivot about their respective end hinges and to fold rearwardly of the frame 10. Concurrently, the ends of the panels 21 pivot about their respective hinges causing the butt hinge 22 to rise and the panels 21 to fold upwardly. The sides 12 are thus drawn together and the wheelbase distance between the castor wheels 28 and the rear wheels 14 is reduced as the foot rest 27 is drawn between the sides 12. Because of the structural arrangement described in biasing the seat 20 and the seat support 18, the same effect is readily obtained simply by pushing the sides 12 together.

In opening the wheelchair to its fully distended position, it is required to draw the sides apart. The same effect is achieved by bearing down on the seat 20. Either action separates the sides 12 which straightens out the folded seat 20 and the folded seat support 18 to their respective distended positions. And, as the seat support 18 unfolds, the bar 25 is displaced outwardly of the frame 10 bringing the footrest 27 forward to its distended position and increasing the wheelbase of the chair to provide improved stability.

A further advantage is attained from the wheelchair of the present invention through an esthetic improvement which avoids the appearance of the prior art wheelchairs that have been described as chromy, cage-like, and institutional as there is no way to cover the metal frame completely with fabric to resemble more contemporary office or home furniture. The structural design of the chair of the present invention allows side panels in the shape of contemporary "bucket" design that allows the entire frame to be covered with fabric or upholstery.

What I claim is:

1. A foldable wheelchair frame, comprising:

a pair of sides arranged in spaced parallel relation, each having a rearwardly disposed outer portion adapted to carry a wheel spindle;

seat support means disposed transversely between the sides, said support means having an upper surface adapted to support a seat, first free ends flexibly connected to opposed first portions of the sides and a first flexible joint intermediate the free ends which permits the support means to fold rearwardly when the sides are drawn together;

a seat disposed transversely between the sides above said support means, the seat having second free ends flexibly connected to opposed second portions of the sides and a second flexible joint intermediate the free ends which permits the seat to fold upwardly when the sides are drawn together; and a bar carried by the first flexible joint and adapted to be longitudinally displaceable forwardly out of and rearwardly into the frame, whereby rearward displacement of the bar draws the sides together and folds the support means and seat.

2. A wheelchair frame as claimed in claim 1 wherein the support means comprise a pair of longitudinal members, arranged in spaced parallel relation, each member including two first half portions having inner ends connected by the first flexible joint.

3. A wheelchair frame as claimed in claim 2 wherein each first half portion comprises an upstanding rectangular panel.

4. A wheelchair frame as claimed in claim 3 wherein the seat comprises two second half portions having inner ends connected by the second flexible joint.

5. A wheelchair frame as claimed in claim 4 wherein each second half portion comprises a rectangular panel, a bottom side of which engages the supporting upper surface when the sides are fully spaced apart.

6. A wheelchair frame as claimed in claim 5, wherein each flexible joint comprises a hinge.

7. A wheelchair frame as claimed in claim 6 wherein the bar includes a tee portion extending forwardly of the frame and downwardly of the first flexible joint.

8. A wheelchair frame as claimed in claim 7 further comprising an adjustable footrest secured to the tee portion.

9. A wheelchair frame as claimed in claim 8 further comprising a pair of wheel spindles, a rear wheel rotatably fitted on each wheel spindle and wheel means secured to the tee portion.

10. A wheelchair frame as claimed in claim 9 wherein said wheel means comprises a castor wheel pivotally mounted at each end of the tee portion.

11. A wheelchair frame as claimed in claim 10 wherein the sides each include an upstanding backrest support member rearwardly inclined above the spindles.

12. A wheelchair frame as claimed in claim 11 further comprising a flexible backrest carried by the backrest support members.

* * * * *